T. T. Prosser
Steam Boiler

№ 1,585 Reissued Dec 1 1863

Witnesses:
A King
Daniel E Groves

Inventor:
T T Prosser

UNITED STATES PATENT OFFICE.

T. T. PROSSER, OF FOND DU LAC, WISCONSIN, ASSIGNOR TO T. T. PROSSER, M. C. DARLING, AND K. A. DARLING.

IMPROVEMENT IN STEAM-BOILERS.

Specification forming part of Letters Patent No. 39,530, dated August 11, 1863; Reissue No. 1,585, dated December 1, 1863.

*To all whom it may concern:*

Be it known that I, TREAT T. PROSSER, of the town and county of Fond du Lac, in the State of Wisconsin, have invented a new and useful application of the exhaust-steam of steam-engines—to wit, for generating steam in steam-boilers; and I do hereby declare the following to be a full and exact description thereof, and of the arrangement by which I carry it into effect, reference being had to the accompanying drawings, and to the letters of reference thereon, forming a part of this specification.

Figure 4:
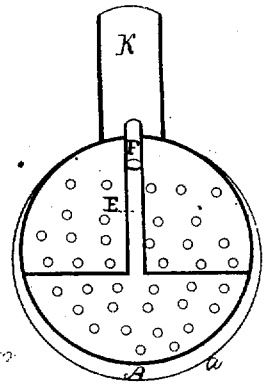
Figure 1:
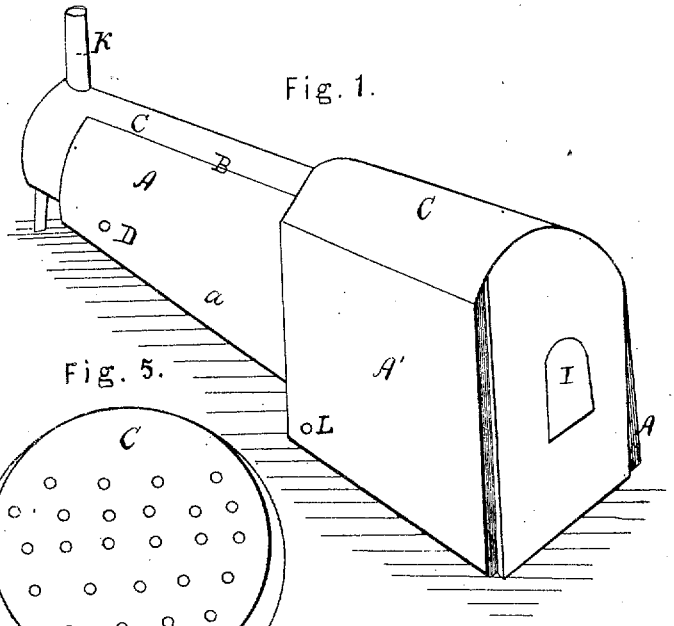
Figure 5:
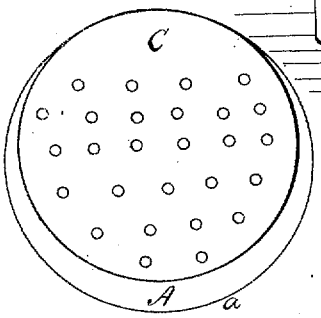
Figure 3:
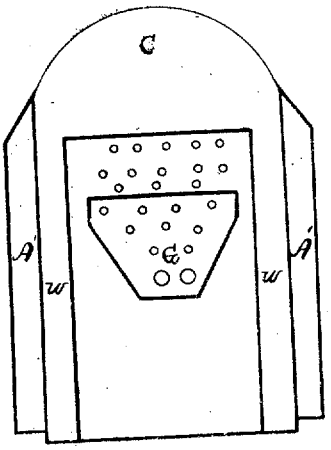
Figure 2:
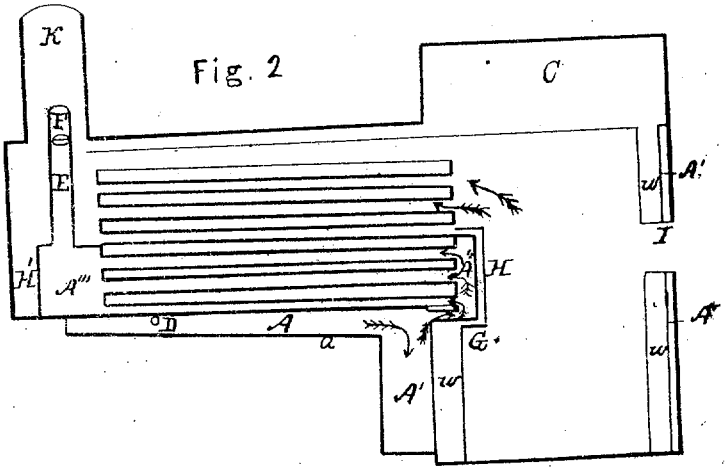

Figure 1 is a perspective view of a tubular or locomotive boiler with my improvement attached thereto. Fig. 2 is a longitudinal section thereof. Fig. 3 is a cross-section thereof through the fire-box. Fig. 4 is a cross-section through the smoke-box; and Fig. 5 is a cross-section of the boiler, &c., between the fire-box and smoke-box.

Heretofore the exhaust-steam of a steam-engine has been used for various purposes—such as heating the feed-water, regulating the draft, &c.—or condensed more or less perfectly by certain arrangement of apparatus, or allowed to escape freely and unutilized into the atmosphere.

The nature or principle of my invention consists in applying this exhaust-steam to the boiler in which it was generated, or to any other boiler or boilers, in such a way as to cause it to impart its remaining heat to the water in the said boiler or boilers, and thus become partly or entirely the means of reproducing steam therein. My mode of doing this, as set forth in the following description thereof, is by forming a chamber more or less completely around the boiler or the fire-box, or both, connecting it, if desirable, with a certain number of the tubes or flues of the boiler, and causing the steam, after it has performed its duty in the cylinder, to exhaust or be exhausted therein. This is the plan which I have so far found most efficient in carrying out the principle of my invention, and in the drawings hereto attached I have shown it as applied to a tubular or locomotive boiler, but by suitable modifications it may be applied to almost any form of boiler. In some cases, as in a long high-pressure-cylinder boiler, with one or more internal flues, it may be sufficient to use the outside chamber, formed by the jacket and the shell of the boiler, only; in other cases, where a sufficient number of condensing-tubes can be had, passing through or immersed in the water, to receive the full volume of the exhaust-steam without abstracting too many from the draft-passage, the outside chamber may be dispensed with; but as a general rule I prefer using them both, where practicable, in the same boiler. Sometimes I apply the exhaust-steam to another, or to other boilers than the one or more in which it was originally generated as live steam, and in some such cases I dispense with a fire or a fire-chamber in or under this or these auxiliary boilers. By mingling or combining the steam thus generated in an auxiliary boiler with that from the principal one before it is allowed to enter the cylinder of the engine, I have obtained what appeared to me better practical results than when the exhaust was used upon the principal boiler only. In other cases, however, the steam thus generated in an auxiliary boiler by the exhaust steam, with or without the assistance of a special fire applied to this boiler, may be advantageously used upon other engines.

The extent of surface of the boiler or fire-box to be covered by the jacket may depend upon the circumstances of the case or the judgment of the engineer. It is generally only necessary to have the exhaust-chamber to reach up to the normal level of the water in the boiler, and thus only expose the water to the action of the heat of the exhaust-steam. In such cases, the whole of the bottom of the boiler would be covered by the chamber. In other cases, however, as in vertical boilers, where the fire-chamber is below, and equal in area, or nearly so, to the cross-section of the boiler, the exhaust-chamber can only be applied to the sides. Again, in cylinder-boilers, where the products of combustion pass directly from the fire-chamber through flues in the boiler to the chimney, the whole boiler may be enveloped in the jacket, making the exhaust-chamber an annular, or nearly annular, cavity entirely surrounding the boiler. In long cylinder-boilers without internal flue or flues, and when the flame and other products of combustion play necessarily directly upon the lower or water surface of the boiler, no chamber for the exhaust-steam being admissible to this part, tubes or flues have to be introduced into the boiler itself for its reception.

The principle in all these cases, and many others might be recited, is the same; the difference is only in the mode of its application.

In the following description of my invention I have adopted an ordinary locomotive-boiler for the purpose of showing fully and clearly the principle of the invention as applied to that form of structure.

In Fig. 1, A shows the chamber for the exhaust-steam, formed by the bottom of the boiler and the jacket *a*. This chamber, it will be seen, extends from the smoke-box to the chamber A′. This exhaust-chamber A′ surrounds the water-space of the fire-box *w w*, Figs. 2 and 3.

In front, and embracing the ends of a certain number of the tubes of the boiler, there is placed a cap, H, which, communicates with the chamber A′ by means of the tubes G, Figs. 2 and 3, and with the aforesaid tubes of the boiler.

H′ is another cap in the smoke-box, covering the same tubes and water-space as H.

In Figs. 4 and 5, A shows sections of the chamber A in Fig. 2.

B is the junction of the jacket *a* with the shell of the boiler, and in such cases as this I prefer that the junction should be as near the normal level of the water in the boiler as possible.

C is the steam-chamber of the boiler.

D is an opening into the exhaust-chamber A, through which the escape-steam from the cylinder of the engine is admitted.

E is the escape-pipe, F a valve therein, and K the chimney or smoke-stack.

A‴ is the box or chest formed by the application of the cap H′, as above described, and is consequently what may be called the "steam box" or "chest" for any uncondensed exhaust-steam that may reach it, and I is the fire-door of the combustion-chamber or fire-box. By this arrangement it will be readily seen that, instead of exhausting the steam from the cylinder of a locomotive-engine directly into the exhaust-pipe, as is usually done, I cause it to pass into the exhaust-chamber A, where, coming in contact with the bottom of the boiler, it gives out a portion of its heat to the water therein. From thence the steam, or a portion of it that has not become condensed into water, passes into and fills the chamber A′, surrounding the fire-box. From thence any that remains uncondensed passes through the pipe G, Figs. 2 and 3, into the chamber A″ formed by the cap H, and thence through the tubes inclosed by the cap to the chamber A‴ formed by the cap H′, and from thence, if any remains uncondensed, it passes out or escapes through the exhaust-pipe E, the outlet for the exhaust-steam as ordinarily adopted in locomotive-engines at the present time. In this arrangement, although a certain number of the tubes are cut off from their connction with the fire-chamber by the caps H and H′, enough are still left or to be left for the free transmission of the products of combustion from that chamber to the smoke chamber. Moreover, while the tubes thus cut off by the caps are well known to be the least efficient as steam-generators, they occupy a position in the coolest part of the water in the boiler best adapted to act as condensers of the exhaust-steam and by the heat abstracted therefrom tend to produce live steam in the boiler with greater rapidity than they would do as conduits for the passage of the products of combustion.

As in this process the latent heat of the exhaust-steam is given up and transferred to the water in the boiler, condensed steam in the form of water is produced. This water of condensation may be pumped back again into the boiler or allowed to escape.

Having thus fully set forth the nature of my invention and described a mode of applying it, what I claim therein, and desire to secure by Letters Patent of the United States, is—

1. The application of the exhaust-steam of a steam-engine to the exterior surface or surfaces of a steam boiler or boilers, or any part thereof, for the purpose of utilizing the latent and sensible caloric thereof, in the production of more steam.

2. The chambers A A′ A″ A‴, severally or in combination.

3. The chambers A A′ A″ A‴, severally or collectively, in combination with one or more tubes or flues of a steam-boiler, in the manner and for the purpose set forth.

4. Using one or more of the tubes or flues ordinarily used for the transmission of the products of combustion from the fire-chamber to the chimney or smoke-stack for the reception of the exhaust-steam of an engine, for the purpose set forth.

5. Introducing a flue or flues, a tube or tubes, into the water-space of a steam-boiler and using it or them for the reception of the exhaust-steam of an engine, for the purpose set forth.

TREAT T. PROSSER.

Witnesses:

JOHN A. EASTMAN,
W. F. KELLOGG.